(12) United States Patent
Nanaumi et al.

(10) Patent No.: US 8,267,165 B2
(45) Date of Patent: Sep. 18, 2012

(54) VEHICULAR AIR CONDITIONING APPARATUS

(75) Inventors: Kyosuke Nanaumi, Tochigi-ken (JP);
Mitsufumi Imasawa, Utsunomiya (JP);
Tsunetoshi Kitamura, Utsunomiya (JP);
Junichi Kanemaru, Columbus, OH (US); Shinji Kakizaki, Dublin, OH (US); Daniel Yelles, Marysville, OH (US)

(73) Assignees: Keihin Corporation, Tokyo (JP);
Honda Motor Co., Ltd., Tokyo (JP)

( * ) Notice: Subject to any disclaimer, the term of this patent is extended or adjusted under 35 U.S.C. 154(b) by 539 days.

(21) Appl. No.: 12/500,693

(22) Filed: Jul. 10, 2009

(65) Prior Publication Data

US 2011/0005710 A1    Jan. 13, 2011

(51) Int. Cl.
*B60H 1/00* (2006.01)
*B60H 3/00* (2006.01)
*F24F 11/06* (2006.01)
*F28F 1/00* (2006.01)
*B61D 27/00* (2006.01)

(52) U.S. Cl. ........ 165/202; 165/201; 165/204; 165/244; 165/41; 165/42; 454/75; 454/229; 454/239; 454/256

(58) Field of Classification Search .......... 165/41, 165/42, 43, 204, 202, 244; 416/36, 38, 55; 454/75, 229, 239, 256
See application file for complete search history.

(56) References Cited

U.S. PATENT DOCUMENTS

| | | | | |
|---|---|---|---|---|
| 4,559,994 A | * | 12/1985 | Waldmann et al. | 165/41 |
| 4,800,951 A | * | 1/1989 | Sakurai | 165/203 |
| 4,858,676 A | * | 8/1989 | Bolfik et al. | 165/202 |
| 5,309,731 A | | 5/1994 | Nonoyama et al. | |
| 5,390,728 A | * | 2/1995 | Ban | 165/204 |
| 6,308,770 B1 | * | 10/2001 | Shikata et al. | 165/42 |
| 6,311,763 B1 | * | 11/2001 | Uemura et al. | 165/43 |
| 6,422,309 B2 | * | 7/2002 | Vincent | 165/204 |
| 6,640,890 B1 | * | 11/2003 | Dage et al. | 165/203 |
| 2004/0093885 A1 | * | 5/2004 | Ito et al. | 62/244 |
| 2005/0126774 A1 | * | 6/2005 | Yamaguchi et al. | 165/204 |
| 2007/0023180 A1 | * | 2/2007 | Komarek et al. | 165/202 |

FOREIGN PATENT DOCUMENTS

| | | |
|---|---|---|
| JP | 05-178068 | 7/1993 |
| JP | 06-040236 | 2/1994 |
| JP | 06-191257 | 7/1994 |

* cited by examiner

*Primary Examiner* — Henry Yuen
*Assistant Examiner* — Ian Soule
(74) *Attorney, Agent, or Firm* — Rankin, Hill & Clark LLP

(57) ABSTRACT

In a vehicular air conditioning apparatus, a connection duct connects a first blower unit having a first blower fan to a side of a casing forming air passages, whereas a second blower unit having a second blower fan, different from the first blower unit, is connected to a lower portion of the casing. By driving the first blower fan and second blower fan simultaneously, air is supplied to a vehicle compartment from the first blower unit and the second blower unit through inside the casing. A controller controls the driving of the first blower fan and the second blower fan.

11 Claims, 9 Drawing Sheets

VEHICULAR AIR CONDITIONING APPARATUS

BACKGROUND OF THE INVENTION

1. Field of the Invention

The present invention relates to a vehicular air conditioning apparatus mounted in a vehicle for blowing air into a vehicle compartment that has been adjusted in temperature by a cooling means and a heating means, for thereby performing temperature adjustment of the vehicle compartment.

2. Description of the Related Art

In a vehicular air conditioning apparatus that is mounted in a vehicle, internal and external air is drawn into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, it is known to provide a first blower for the purpose of taking in air from the vehicle compartment into the casing, and a second blower for the purpose of taking in external air outside of the vehicle compartment into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port. More specifically, a switching operation is performed such that when air is blown out from the face blow-out port or the foot blow-out port, the first blower is driven and air from the interior of the vehicle is introduced, whereas when air is blown out from the defroster blow-out port, the second blower is rotated and external air is introduced.

Further, in another vehicular air conditioning device having first and second blowers for introducing air, the first blower is arranged facing toward an external air introducing port of a duct, and the second blower is arranged facing toward an interior air introducing port. Additionally, the first blower includes a switching means, which is capable of switching the air that is introduced to the duct by the first blower between interior air and exterior air.

In addition, the air that is introduced to the duct by the first blower is switched between interior air and exterior air by the switching means, and after the air has been adjusted in temperature by a heating means and a cooling means so as to provide a desired temperature together with the air introduced to the duct by the second blower, the air is blown into a desired region in the vehicle compartment through a face blow-out port, a foot blow-out port, or a defroster blow-out port. (See, for example, Japanese Laid-Open Patent Publication No. 05-178068, Japanese Laid-Open Patent Publication No. 06-040236, and Japanese Laid-Open Patent Publication No. 06-191257.)

However, although reducing energy for heating operation the above-mentioned vehicular air conditioning apparatus does not reduce power consumed by the blowers. In other words, two blowers are driven independently based on the required amounts of the internal air to be circulated and the external air to be introduced. That is, the above-mentioned vehicular air conditioning apparatus is not configured to minimize the total power consumption of the two blowers, in view of the totally required amount of the air that is the sum of the air flow rate of one blower and the air flow rate of the other blower.

SUMMARY OF THE INVENTION

A general object of the present invention is to provide a vehicular air conditioning apparatus, which is capable of coordinating a plurality of blowers and controlling driving thereof in order to lower power consumption.

In order to achieve the aforementioned object, the present invention is characterized by a vehicular air conditioning apparatus including a casing having a plurality of passages through which air flows, cooling means for cooling air to supply cooled air, heating means for heating air to supply heated air, and a damper mechanism for switching flow of the air that flows through the passages, the cooling means, the heating means and the damper mechanism being disposed in an interior of the casing, wherein the vehicular air conditioning apparatus further comprises: a first passage disposed in the casing, the air flowing through the first passage; a first blower connected to the first passage, a blowing rate of the air blown from the first blower to the first passage being changeable; a second passage disposed in the casing separately from the first passage, the air flowing through the second passage; a second blower connected to the second passage and having a capacity smaller than that of the first blower, a blowing rate of the air blown from the second blower to the second passage being changeable; and a controller for controlling driving of each of the first blower and the second blower, and wherein the controller controls the driving of each of the first blower and the second blower such that a total power consumed when the first and second blowers are driven simultaneously is less than a total power consumed when firstly the first blower is driven and then the second blower is driven, for a desired air blowing amount.

With the present invention, the controller coordinates the driving of the first blower and the second blower so that, when the first and second blowers are driven simultaneously, the air blowing into a vehicle compartment from the first blower through the first passage and the air blowing into the vehicle compartment from the second blower through the second passage achieve the desired air blowing amount, and the total power consumed by the first and second blowers is less that the power consumed when firstly the first blower is driven, and then the second blower is driven.

With this structure, it is possible to supply the air at a desired blowing amount to vehicle compartment so as to adjust the temperature in the vehicle compartment independently with the first blower and the second blower, while suppressing the total power consumption by the first and second blowers. As a result, the overall power consumed by the vehicular air conditioning apparatus can further be reduced.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
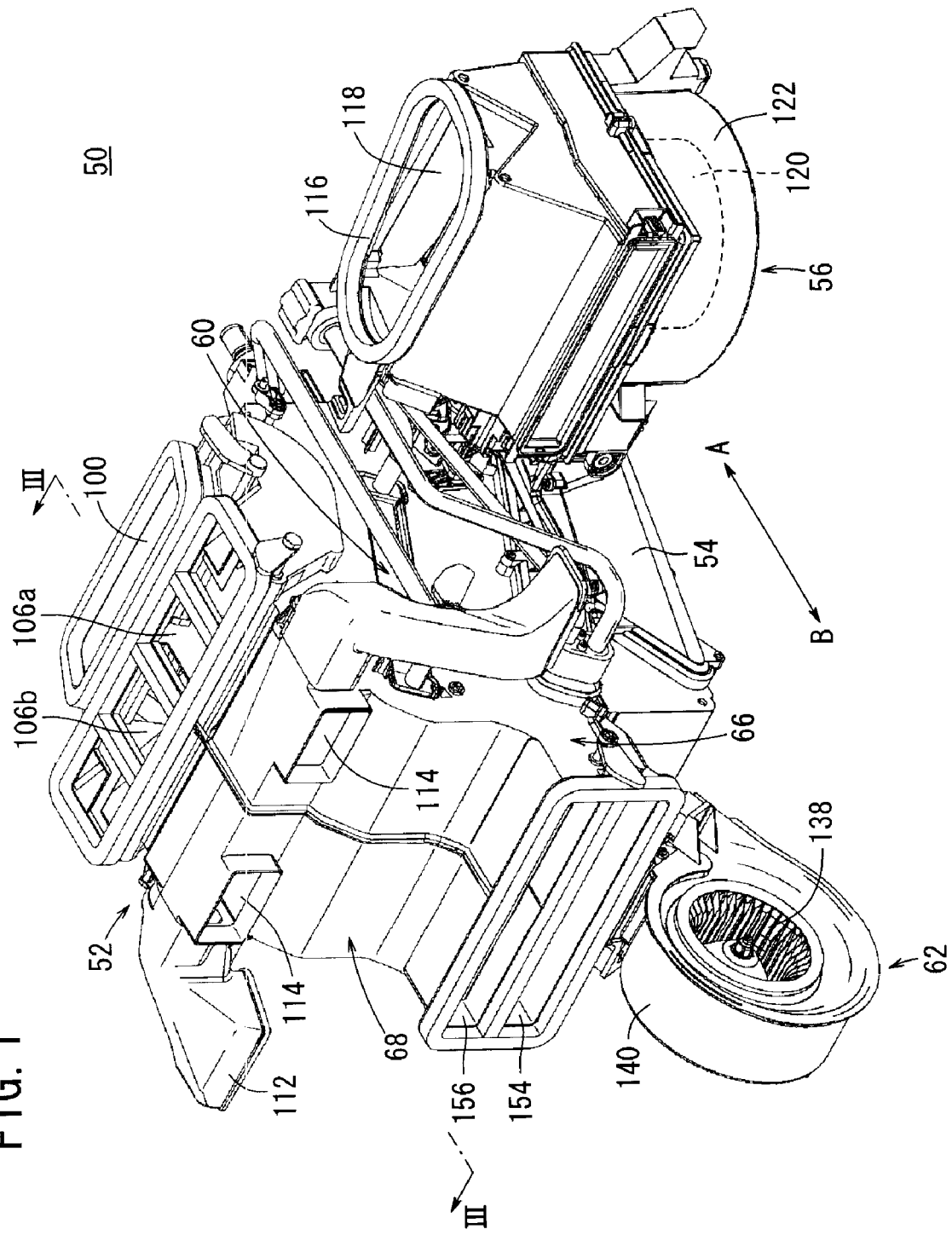
FIG. 1 is an external perspective view of a vehicular air conditioning apparatus according to an embodiment of the present invention.

A preferred embodiment of a vehicular air conditioning apparatus shall be presented and explained in detail below with reference to the accompanying drawings. In FIG. 1, reference numeral 50 indicates a vehicular air conditioning apparatus according to an embodiment of the present invention. The vehicular air conditioning apparatus 50, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
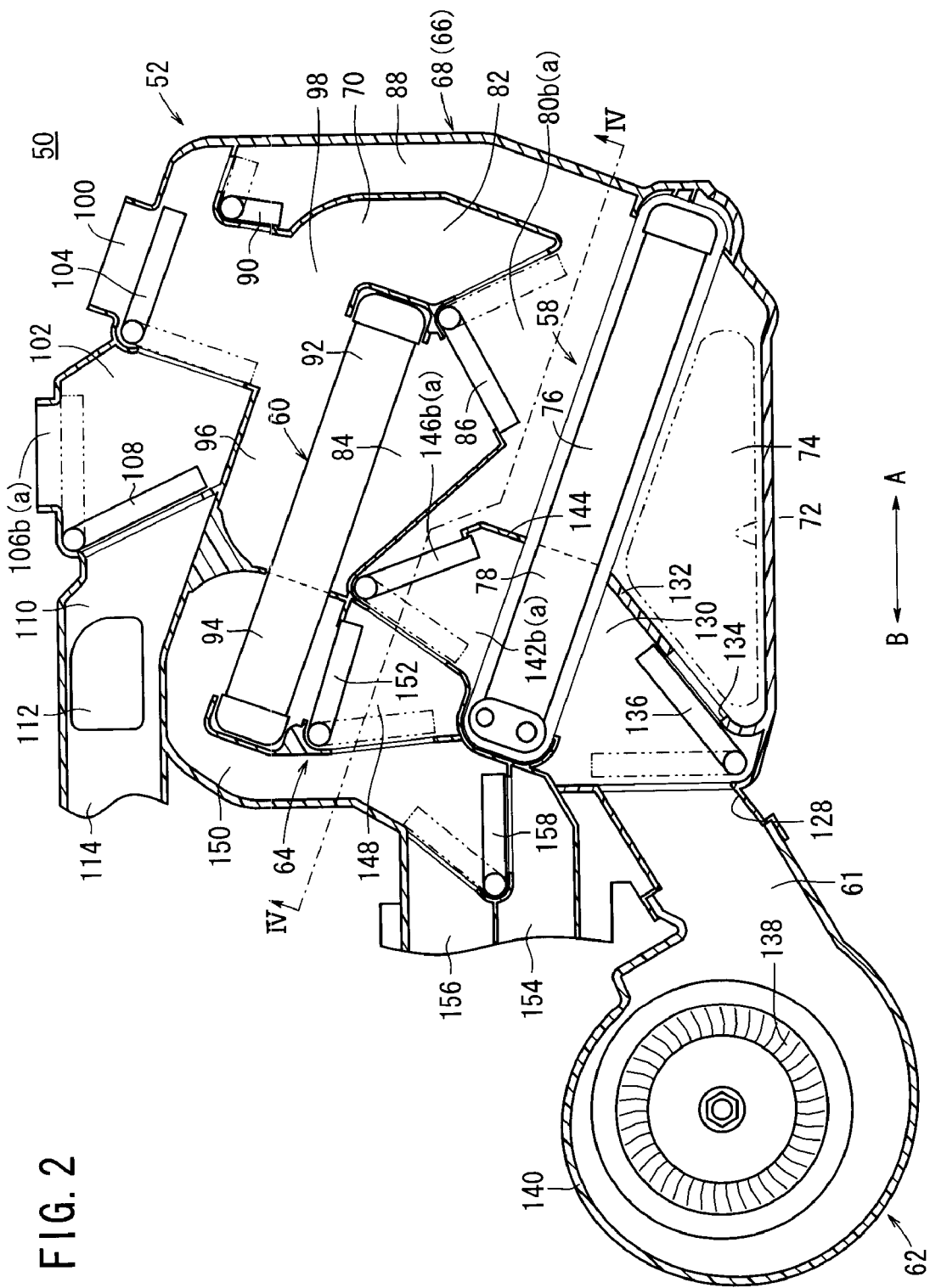
FIG. 2 is an overall cross sectional view of the vehicular air conditioning apparatus shown in FIG. 1.

Further, the vehicular air conditioning apparatus 50 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the present embodiment, inside the casing, plural rotating members made up of dampers or the like are provided, wherein the rotating members are operated by rotational drive sources such as motors or the like. For purposes of simplification, depictions and explanations concerning such rotational drive sources have been omitted.

As shown in FIGS. 1 and 2, the vehicular air conditioning apparatus 50 includes a casing 52 constituted by respective air passages, a first blower unit (first blower) 56 connected through a connection duct 54 to a side portion of the casing 52 for blowing air toward the front seat side of the vehicle, an evaporator (cooling means) 58 for cooling air and a heater core (heating means) 60 for heating air that are arranged inside the casing 52, a second blower unit (second blower) 62 connected to a lower portion of the casing 52 for taking in air from inside the vehicle compartment (interior air) and blowing the air toward the rear seats of the vehicle, and a damper mechanism 64 for switching the flow of air that flows through and inside each of the respective passages.

The casing 52 is constituted by first and second divided casings 66, 68 having substantially symmetrical shapes, wherein a center plate 70 is disposed between the first divided casing 66 and the second divided casing 68. The connection duct 54 is connected on a lower side portion of the first divided casing 66, and a first intake port 72 is formed through which air is supplied from the first blower unit 56. The first intake port 72 communicates with a first front passage (first passage) 74 disposed on an upstream side of the evaporator 58. The evaporator 58 is disposed so as to straddle between the first divided casing 66 and the second divided casing 68. One end of the evaporator 58 in the forward direction (the direction of arrow A) of the vehicle is inclined downward at a predetermined angle with respect to the other end thereof in the rearward direction of the vehicle.

The evaporator 58 includes a first cooling section 76, which faces the first front passage 74 and cools air supplied from the first front passage 74, and a second cooling section 78, which faces the first rear passage 130 and cools air supplied from the first rear passage 130.

On the other hand, on a downstream side of the evaporator 58, second front passages 80a, 80b are formed, through which air having passed through the first cooling section 76 is supplied. Upwardly of the second front passages 80a, 80b, a third front passage 82 and a fourth front passage 84 are formed in a branching or bifurcated manner. Further, in the second front passages 80a, 80b, a first air mixing damper 86 is rotatably disposed so as to face toward the branching portion of the third front passage 82 and the fourth front passage 84. Additionally, by rotation of the first air mixing damper 86, the blowing condition and blowing rate of cooled air that has passed through the evaporator 58 into the third front passage 82 and the fourth front passage 84 is adjusted. The third front passage 82 is arranged on the forward side (the direction of arrow A), whereas the fourth front passage 84 is arranged on the rearward side (the direction of arrow B) of the casing 52. The heater core 60 is disposed on a downstream side of the fourth front passage 84.

Further, on the forward side (in the direction of arrow A) of the third front passage 82, a bypass passage 88 is formed, which extends along the third front passage 82 and supplies air to a later-described mixing section 98 downstream from the evaporator 58, and a bypass damper 90 is disposed on a downstream side of the bypass passage 88. The bypass passage 88 is provided to supply cool air cooled by the evaporator 58 directly to the downstream side under a switching action of the bypass damper 90.

The heater core 60, similar to the evaporator 58, is disposed so as to straddle between the first divided casing 66 and the second divided casing 68. One end of the heater core 60 in the forward direction (the direction of arrow A) of the vehicle is inclined downward at a predetermined angle with respect to the other end thereof in the rearward direction of the vehicle. The heater core 60 includes a first heating section 92, which faces the fourth front passage 84 and heats air supplied from the fourth front passage 84, and a second heating section 94, which faces the third rear passage 148 and heats air supplied from the third rear passage 148.

On the downstream side of the heater core 60, a fifth front passage 96 is formed. The fifth front passage 96 extends in the forward direction, and at a location that merges downstream from the third front passage 82, the mixing section 98 is formed, in which cooled air supplied through the third front passage 82 and warm air supplied through the fifth front passage 96 are mixed. A defroster blow-out port 100 opens upwardly of the mixing section 98, and to the side of the mixing section 98, a sixth front passage 102 extending rearward is formed.

Further, in the mixing section 98, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, a first vent blow-out port 106 opens upwardly, and a vent damper 108 is rotatably disposed facing toward the first vent blow-out port 106, and communicating with a seventh front passage 110, which extends further rearward. By rotation of the vent damper 108, the blowing state of air is switched when air is blown from the mixing section 98 to the first vent blow-out port 106 and the seventh front passage 110, and further, the blowing rate of the air is capable of being adjusted.

The defroster blow-out port 100 and the first vent blow-out port 106 open respectively upwardly of the casing 52. The defroster blow-out port 100 is arranged on a forward side (in the direction of arrow A), whereas the first vent blow-out port 106 is arranged on the rearward side (in the direction of arrow B), substantially centrally in the casing 52 with respect to the defroster blow-out port 100.

On a downstream side of the seventh front passage 110, a first heat passage 112 is connected, which extends in the widthwise direction of the casing 52 and blows air through a non-illustrated first heat blow-out port in the vicinity of the feet of passengers in the front seats in the vehicle compartment. Together therewith, a second heat passage 114 is connected, which extends rearwardly of the casing 52 and blows air through a second heat blow-out port (not shown) in the vicinity of the feet of passengers in the middle seats inside the vehicle compartment.

The first blower unit 56 includes an intake damper 118 in which a duct 116 for introducing external air is disposed in an inlet opening thereof, for carrying out switching of internal and external air, and a first blower fan 120 for supplying to the interior of the casing 52 air (external air or internal air) that is taken in from the duct 116. A blower case 122 in which the first blower fan 120 is accommodated communicates with the interior of the casing 52 via a connection duct 54 connected to the first intake port 72. The first blower fan 120 is controlled by a blower motor 121, which is driven by supplying electrical power thereto.

In this manner, air supplied from the first blower unit 56 is introduced to the interior of the casing 52 through the connection duct 54 and the first intake port 72, and by rotating actions of the first air mixing damper 86, the defroster damper 104, the vent damper 108 and the bypass damper 90, which collectively make up the damper mechanism 64, air is selectively supplied through the first through seventh front passages 74, 80a, 80b, 82, 84, 96, 102, 110, and the bypass passage 88 into the defroster blow-out port 100, the first vent blow-out port 106 and the first and second heat passages 112, 114, which are capable of blowing air to the front and middle seats in the vehicle.

On the other hand, on a lower portion of the casing 52, a second intake port 128 through which air is supplied from the second blower unit 62 is formed on a rearward side (in the direction of arrow B) perpendicular to the first intake port 72. The second intake port 128 opens at a position on an upstream side of the evaporator 58 and communicates with the first rear passage 130.

The first rear passage 130 is separated from the first front passage 74 by a first dividing wall 132, and a rotatable ventilation switching damper 136 is provided between a communication opening 134 formed in the first dividing wall 132 and the second intake port 128. In addition, in the case that a mode is selected in which blowing of air from the second blower unit 62 is halted and blowing of air only from the first blower unit 56 is carried out, by blocking the second intake port 128 by the ventilation switching damper 136 (i.e., the state shown by the two-dot-dash line in FIG. 2), backflowing of air into the second blower unit 62 can be prevented when a portion of the air supplied from the first blower unit 56 passes through the interior of the evaporator 58 and the heater core 60, and is leaked out to the side of the first through fourth rear passages 130, 142a, 142b, 148, 150. Consequently, noise generated at the second blower unit 62 caused by backflowing of air can be prevented, and air is prevented from reaching the second blower unit 62 and being blown out into the vehicle compartment. In other words, blowing of unnecessary air into the vehicle compartment is averted, and imparting a sense of discomfort to occupants in the vehicle can be avoided.

Figure 5:
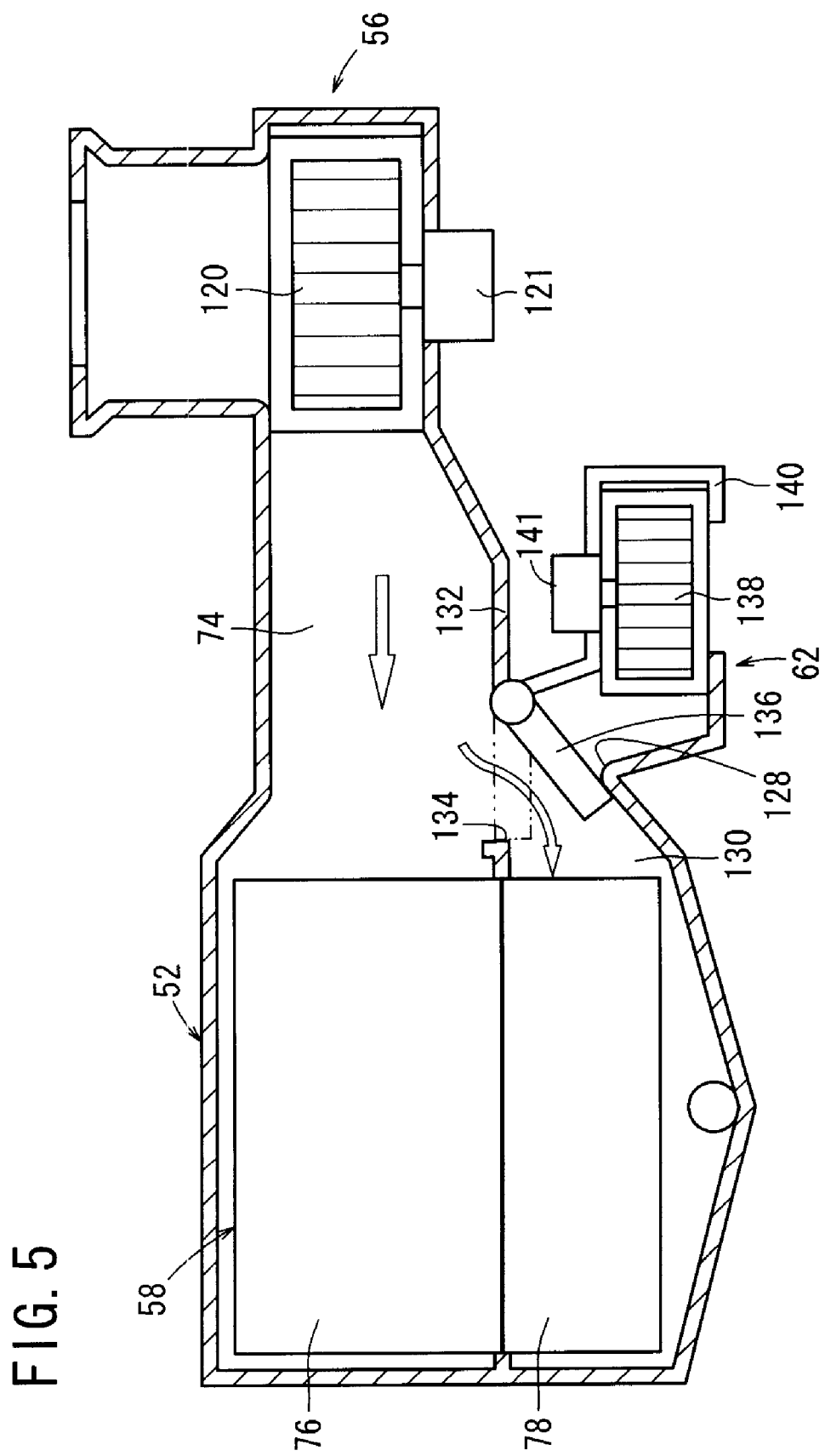
FIG. 5 is an outline schematic view showing a casing, first and second blower units, and an evaporator that constitute the vehicular air conditioning apparatus of FIG. 1.

In this case, as shown in FIG. 5, by rotating the ventilation switching damper 136 to the side of the second intake port 128 and opening the communication opening 134, a portion of the air supplied to the first front passage 74 can be supplied to the side of the first rear passage 130. Driving control of the ventilation switching damper 136 shall be described subsequently.

The second blower unit 62 includes a second blower fan 138 that takes in air (internal air) from the vehicle compartment and supplies the intake air to the interior of the casing 52. A blower case 140 in which the second blower fan 138 is accommodated is connected to the second intake port 128 of the casing 52 and communicates with the first rear passage 130. The second blower fan 138, similar to the first blower fan 120, is controlled by a second blower motor 141, which is driven by supplying electrical power thereto.

On a downstream side of the first rear passage 130, second rear passages 142a, 142b are formed to which air that has passed through the second cooling section 78 of the evaporator 58 is supplied. The second rear passages 142a, 142b are separated from the second front passages 80a, 80b by a second dividing wall 144, and the second dividing wall 144 extends to the evaporator 58. Owing thereto, on a downstream side of the evaporator 58, air that has passed through the first rear passage 130 and flows to the second cooling section 78 of the evaporator 58 does not intermix mutually with air that has passed through the first front passage 74 and flows to the first cooling section 76 of the evaporator 58.

Figure 3:
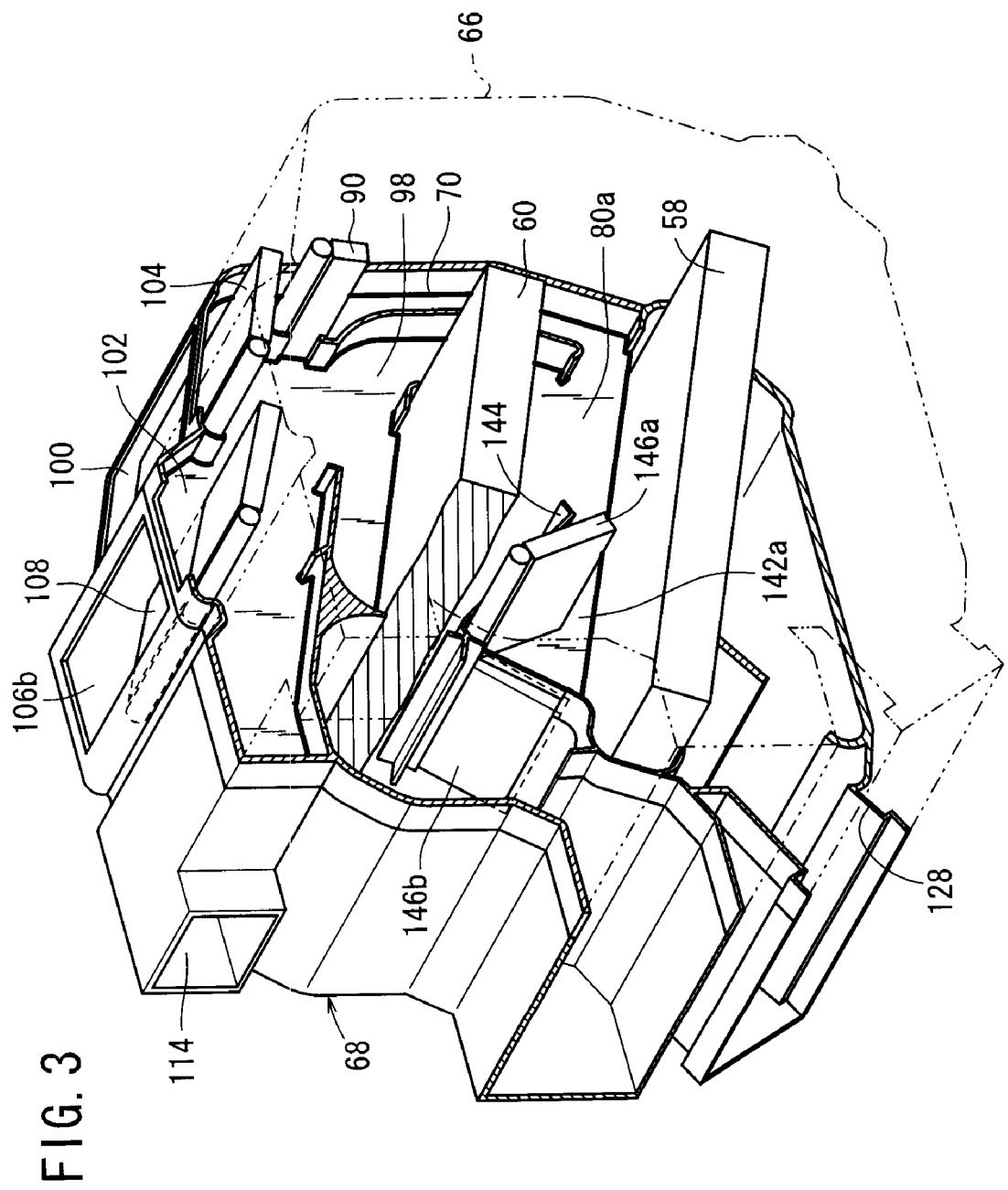
FIG. 3 is a cross sectional perspective view taken along line III-III of FIG. 1.
Figure 4:
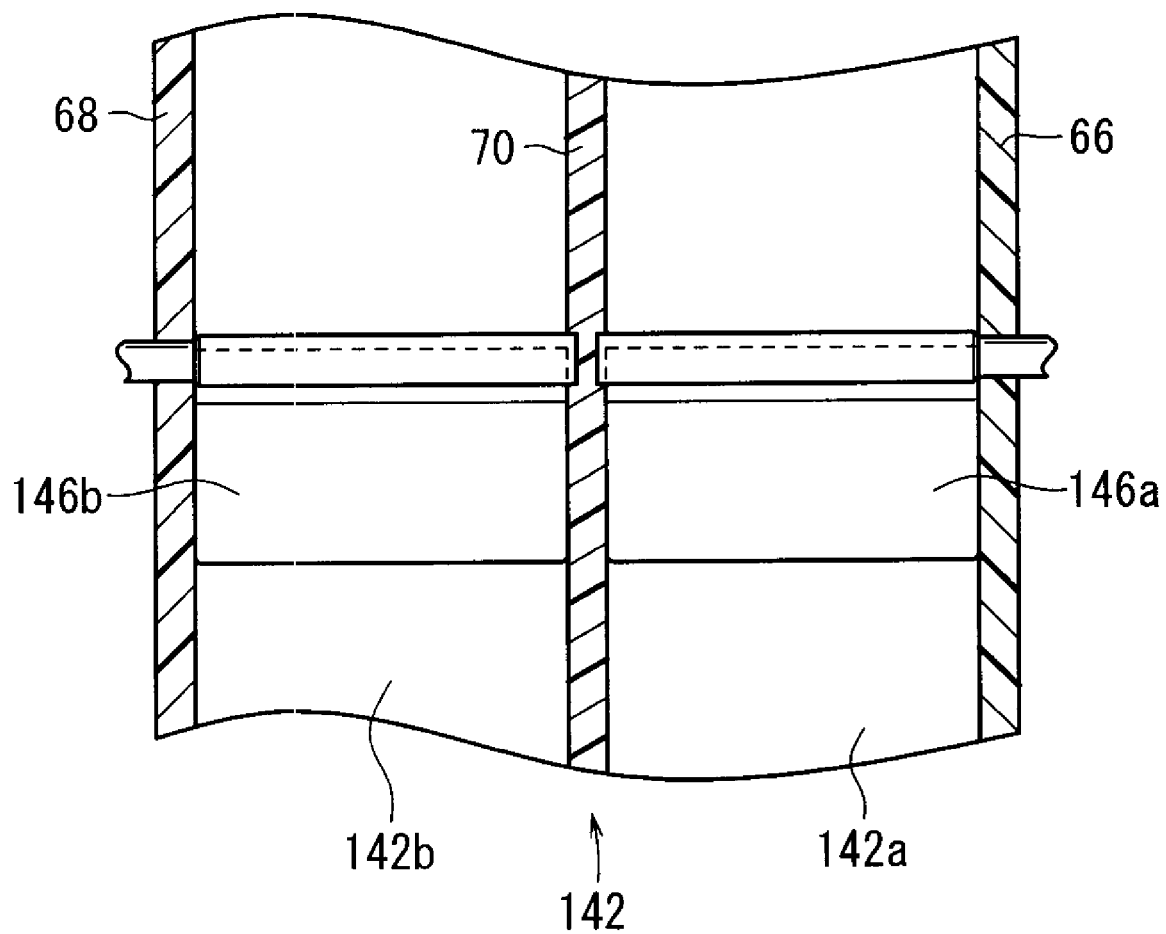
FIG. 4 is a partial cross sectional view taken along line IV-IV of FIG. 2.

Herein, as shown in FIG. 3, the second rear passages 142a, 142b, the second front passages 80a, 80b and the first vent blow-out port 106 are separated respectively on sides of the first and second divided casings 66, 68 about the center plate 70, which is disposed in the center of the casing 52, thereby forming the second rear passage 142a and the second rear passage 142b, the second front passage 80a and the second front passage 80b, and the first vent blow-out port 106a and the first vent blow-out port 106b. Furthermore, as shown in FIG. 4, a pair of communication switching dampers 146a, 146b, which are capable of switching a communication state between the second front passage 80a and the second front passage 80b, are disposed in the second rear passage 142a and the second rear passage 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 80a, 80b for blowing air to the front seats in the vehicle compartment, such that, for example, by changing the rotation amount of one of the communication switching dampers 146a and the rotation amount of the other communication switching damper 146b, the blowing rate and temperature of air that is blown from the first vent blow-out port 106a through the second front passage 80a, and the blowing rate and temperature of air that is blown from the first vent blow-out port 106b through the second front passage 80b, can be controlled separately from each other.

The third rear passage 148 facing the heater core 60 is formed on the downstream side of the second rear passages 142a, 142b. One side of the heater core 60 opens into the third rear passage 148, whereas another side thereof opens onto the side of an adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 60. Consequently, air cooled by the evaporator 58 and supplied to the third rear passage 148, and air heated by the heater core 60 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as a mixing section, for mixing cool air and warm air that is blown to the middle seats and rear seats in the vehicle.

The fourth rear passage 150 bends so as to circumvent the other end of the heater core 60 and extends to communicate with fifth and sixth rear passages 154, 156, which branch on a downstream side thereof. A rotatable mode switching damper 158 is disposed at the branching location of the fifth and sixth rear passages 154, 156. The communication state between the fourth rear passage 150 and the fifth and sixth rear passages 154, 156 is switched by rotation of the mode switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers riding in the middle and rear seats.

More specifically, air supplied from the second blower unit 62 is introduced to the interior of the casing 52 through the second intake port 128, and under rotating actions of the second air mixing damper 152 and the mode switching damper 158, which make up the damper mechanism 64, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 80a, 80b, 82, 84, 96, 102, the bypass passage 88 and the second rear passages 142a, 142b are disposed respectively so as to straddle between the first divided casing 66 and the second divided casing 68. However, as easily understood, these passages also are divided by the center plate 70, which is disposed in the center of the casing 52.

The vehicular air conditioning apparatus 50 according to the embodiment of the present invention is basically constructed as described above. Next, operations and effects of the invention shall be explained.

First, when operation of the vehicular air conditioning apparatus 50 is started, the first blower fan 120 of the first blower unit 56 is rotated by supplying electrical power thereto, and air (interior or exterior air) that is taken in through the duct 116 or the like is supplied to the first front passage 74 of the casing 52 through the connection duct 54. Simultaneously, air (interior air), which is taken in by rotation of the second blower fan 138 of the second blower unit 62 by supplying electrical power thereto, is supplied to the first rear passage 130 from the blower case 140 while passing through the second intake port 128. In the following descriptions, air supplied to the interior of the casing 52 by the first blower fan 120 shall be referred to as "first air," and air supplied to the interior of the casing 52 by the second blower fan 138 shall be referred to as "second air."

The first air and the second air supplied to the interior of the casing 52 are each cooled by passing respectively through the first and second cooling sections 76, 78 of the evaporator 58, and flow respectively as chilled air to the second front passages 80a, 80b and the second rear passages 142a, 142b, in which the first and second air mixing dampers 86, 152 are disposed.

In the case that a vent mode, for example, is selected by a passenger for blowing air in the vicinity of the faces of passengers, the first air mixing damper 86 is rotated to an intermediate position between the third front passage 82 and the fourth front passage 84, whereupon the first air (cooled air) supplied to the third front passage 82 flows into the mixing section 98, and the first air supplied to the fourth front passage 84 is heated by passing through the heater core 60 to become heated air, and flows into the mixing section 98 through the fifth front passage 96, whereby the first cooled air and the first heated air are mixed together.

The first air (mixed air), which is made up of the cool air and heated air mixed in the mixing section 98, passes through the sixth front passage 102 and is blown in the vicinity of the faces of passengers in the vehicle compartment from the first vent blow-out port 106, due to the fact that the defroster blow-out port 100 is blocked by the defroster damper 104, and further, the opening of the seventh front passage 110 is blocked by the vent damper 108.

On the other hand, the second air mixing damper 152 is rotated to an intermediate position in the interior of the third rear passage 148, whereupon the second air (cool air) supplied to the third rear passage 148 is heated by passing through the heater core 60 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side. In addition, under a switching action of the mode switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 86 is rotated somewhat toward the side of the third front passage 82, whereas the vent damper 108 is placed in an intermediate position, rotated somewhat to the side of the first vent blow-out port 106 compared to the case of the vent mode. Additionally, the first air that has passed through the evaporator 58 is supplied directly into the mixing section 98 via the bypass passage 88, is mixed in the mixing section 98 with the first air (mixed air) that is supplied through the third and fifth front passages 82, 96, and is blown in the vicinity of the faces of passengers from the first vent blow-out port 106. Further, a portion of the first air (mixed air), which flows to the sixth front passage 102 from the mixing section 98, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper is rotated somewhat in a direction away from the heater core 60, and the mode switching damper 158 is rotated from the position closing the sixth rear passage 156 to an intermediate position between the fifth rear passage 154 and the sixth rear passage 156. In addition, as for the second air, heated air heated by the heater core 60 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 86 is rotated further to the side of the third front passage 82 compared to the case of the bi-level mode, while the defroster damper 104 and the vent damper 108 are rotated respectively to block the defroster blow-out port 100 and the first vent blow-out port 106. Consequently, the first air (mixed air), which was mixed in the mixing section 98, passes through the sixth and seventh front passages 102, 110 and flows rearward to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode switching damper 158 is positioned to block the fifth rear passage 154. Consequently, the second air (mixed air), which is mixed in the fourth rear passage 150, passes from the fourth rear passage 150, through the sixth rear passage 156, and is supplied to the third and forth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 104 is rotated in a direction to separate from the defroster blow-out port 100, so as to assume an intermediate position between the opening of the sixth front passage 102, and together therewith, the first vent blow-out port 106 is blocked by the vent damper 108 (i.e., the condition of the two-dot-dash line shown in FIG. 2). Consequently, a portion of the first air (mixed air), which is mixed in the mixing section 98, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

Further, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 98 to the opened defroster blow-out port 100 and is blown in the vicinity of the front window in the vehicle. In this case, the defroster mode can be handled solely by blowing first air supplied only from the first blower unit 56, without driving the second blower unit 62.

Further, at this time, the ventilation switching damper 136 is rotated to separate away from the first dividing wall 132 thereby opening the communication opening 134, and the communication switching damper 146a(b) is rotated to place the second rear passage 142a(b) and the second front passage 80a(b) in communication, so that a portion of the first air supplied to the first front passage 74 is supplied to the side of the first rear passage 130. As a result, even in the case that the second blower unit 62 is not driven and second air is not supplied to the second rear passages 142a, 142b, since a portion of the first air can be made to pass through the second cooling section 78 of the evaporator 58, freezing of the evaporator 58 can be prevented.

Moreover, by rotating the ventilation switching damper 136 to close the second rear passage 142a(b), the noise caused when the first air flows into the second blower unit 62 can be prevented.

In each of the blowing modes excluding the aforementioned defroster mode, the first blower fan 120 and the second blower fan 138 are driven simultaneously, so that the first and second air are supplied at desired flow rates to the interior of the casing 52. In this case, in the present embodiment, drive controls for the first blower fan 120, the second blower fan 138 and the ventilation switching damper 136 are carried out through a controller 160 (described later), corresponding to a first air supply rate (blowing rate) and a second air supply rate (blowing rate) required during each of the blowing modes. First, the drive control for the ventilation switching damper 136 shall be explained below.

Figure 6A:
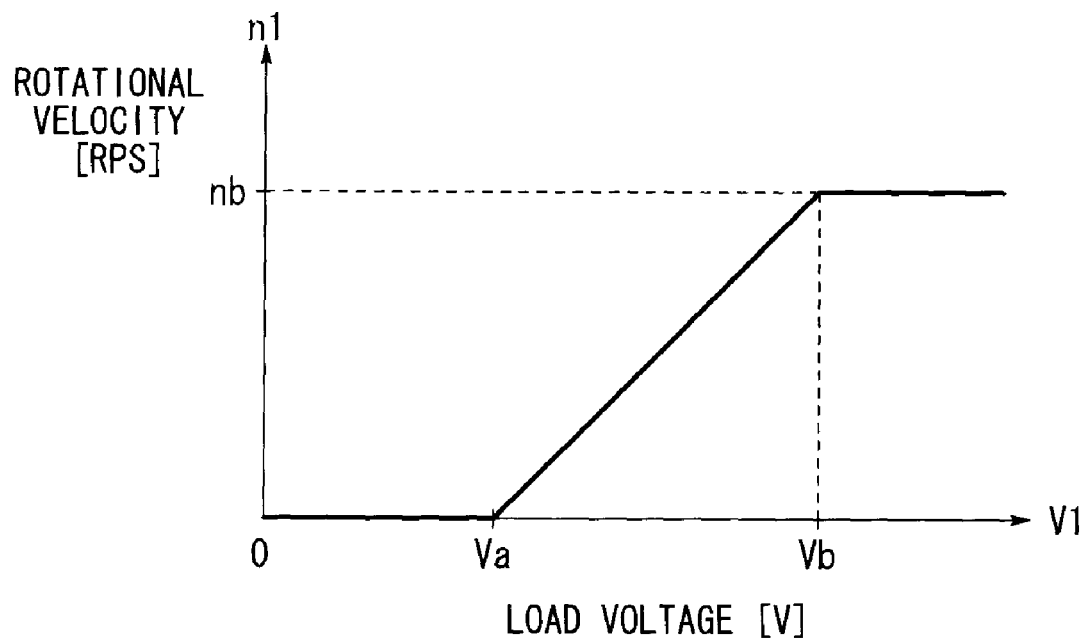
FIG. 6A is a correlational diagram showing a correlation between rotational speed and load voltage in the first blower fan.

Although the blowing rate of the first air is proportional to the rotation number (RPS), or more specifically the rotational velocity $n_1$, of the first blower fan 120, the rotational velocity $n_1$ can be determined approximately by a load voltage $V_1$, which is supplied from a later-described power source 176 and through a first fan driver 170 to the first blower motor 121 that rotates the first blower fan 120. FIG. 6A shows a relationship between the rotational velocity $n_1$ of the first blower fan 120 and the load voltage $V_1$ supplied to the first blower fan 120. In this case, a drive start voltage of the first blower fan 120 is designated by $V_a$, whereas the maximum rated voltage of the first blower fan 120 is designated by $V_b$. In the case that the voltage $V_1$ is less than $V_a$, the first blower fan 120 is not rotated. Further, in the case that the voltage $V_1$ is greater than $V_b$, the voltage $V_1$ is stepped down to the voltage $V_b$ by a voltage protection circuit made up of a non-illustrated regulator or the like, whereby the first blower fan 120 is rotated at the same rotational velocity $n_b$ as when the voltage $V_b$ is applied. As a result, imposition of a voltage on the first blower fan 120 that exceeds the maximum rated voltage is prevented, so that damage is not caused to the first blower fan 120 and the first fan driver 170.

Figure 6B:
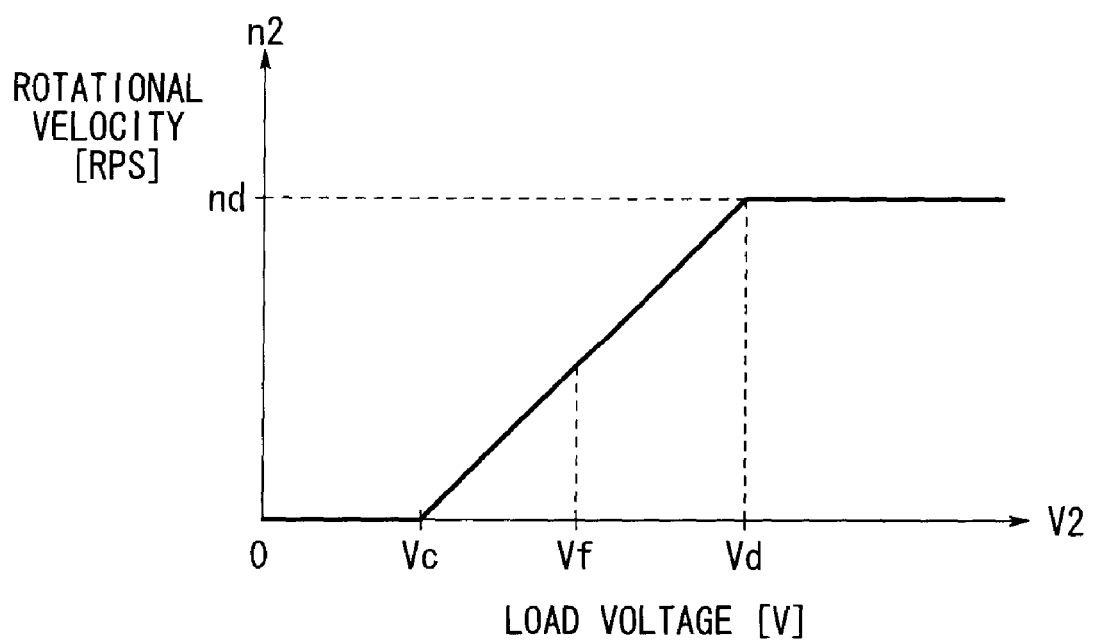
FIG. 6B is a correlational diagram showing a correlation between rotational speed and load voltage in the second blower fan.

Also, in the case that the second blower fan 138 is energized for blowing air, analogous to the case of the first blower fan 120, as shown in FIG. 6B, the load voltage supplied to the second fan driver 172 from the power source 176 is designated by V2, the rotational velocity is designated by n2, the drive start voltage is designated by Vc, the maximum rated voltage is designated by Vd, and the rotational velocity when the voltage Vd is applied is designated by nd. However, since control is carried out in the same manner as the control for the first blower fan 120, detailed explanations thereof have been omitted.

Figure 7:
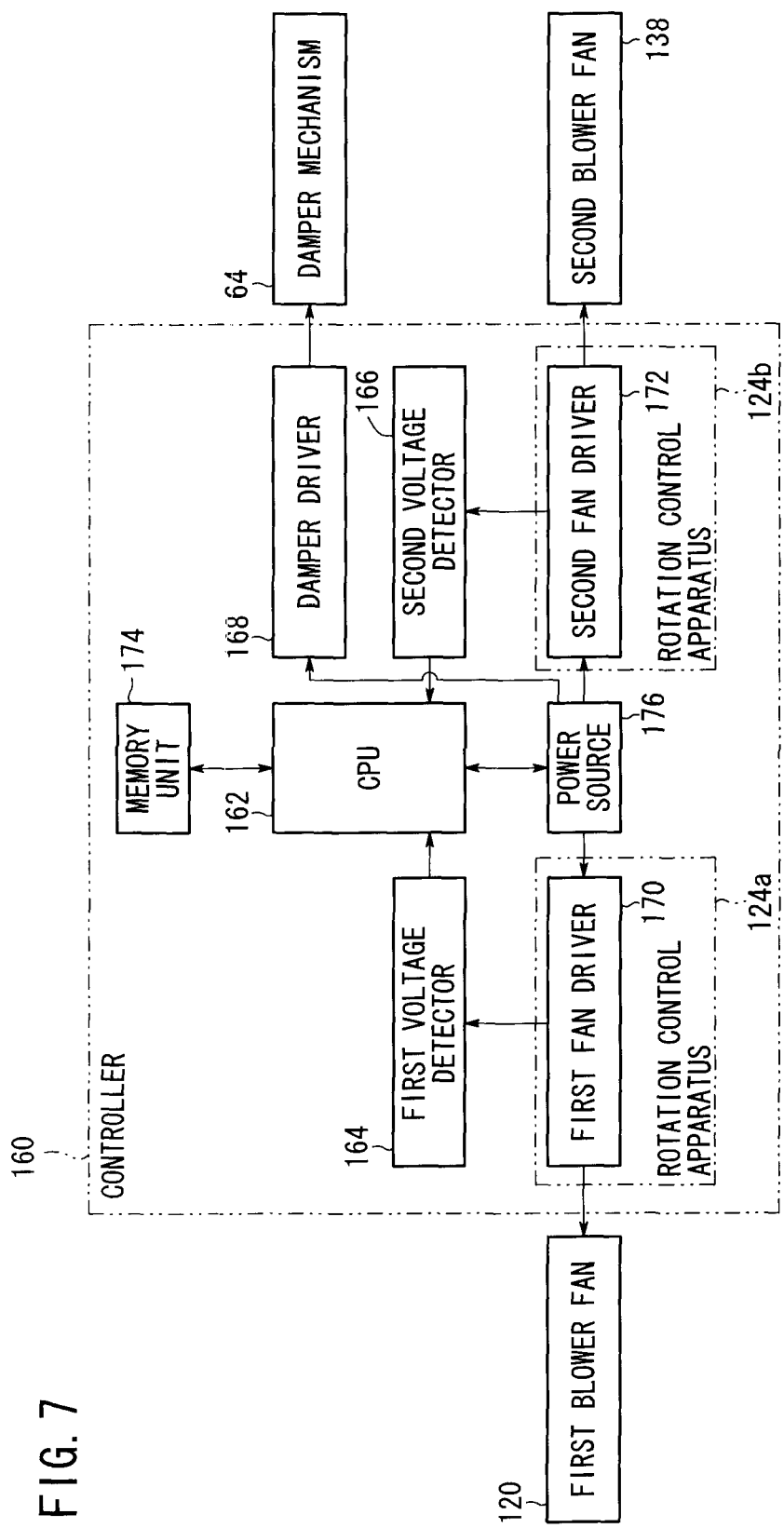
FIG. 7 is an outline block diagram of a controller.

As shown in FIG. 7, the controller 160 includes a CPU (Central Processing Unit) 162 that serves as a main controller, a first fan driver 170 for driving the first blower fan 120, a second fan driver 172 for driving the second blower fan 138, a first voltage detector 164 for detecting the load voltage V1 supplied to the first fan driver 170, a second voltage detector 166 for detecting the load voltage V2 supplied to the second fan driver 172, a damper driver 168 for driving the damper mechanism 64, a memory unit 174 constituted by a RAM (Random Access Memory) and a ROM (Read Only Memory), and a power source 176 that supplies power to the damper driver 168 and to the first and second fan drivers 170, 172. Each of the aforementioned functional elements are implemented by the CPU 162, which reads in a program, and by effecting software processing in cooperation with the memory unit 174. The first fan driver 170 may be incorporated into a rotation control apparatus 124a, and the second fan driver may be incorporated into a rotation control apparatus 124b.

A first air flow rate A1, which represents a flow rate of the first air corresponding to one rotation of the first blower fan 120, a second air flow rate A2, which represents a flow of the second air corresponding to one rotation of the second blower fan 138, an electrical resistance R1 of the first blower fan 120, and an electrical resistance R2 of the second blower fan 138 are stored beforehand in the memory unit 174. However, the data stored in the memory unit 174 is not necessarily limited to these items.

In the case that data of the load voltage V2 received by the CPU 162 is such that V2<Vc, i.e., in the case that the second blower fan 138 is not rotated (n2=0), the ventilation switching damper 136 constituting the damper mechanism 64 is rotated by an instruction from the CPU 162, and by power being supplied to the damper driver 168 from the power source 176, whereby the second intake port 128 is blocked (see FIG. 5). Consequently, by supplying first air from the first front passage 74, through the communication opening 134, past the first rear passage 130, and to the second cooling section 78, freezing and adhering of water droplets, which occur on the surface of the second cooling section 78, can be prevented. Further, by blocking the second intake port 128, noises in the vehicle compartment, the possibility of which is caused by air inside the casing 52 backflowing and reaching the second blower fan 138 of the second blower unit 62, can be reduced insofar as possible.

Further, concerning the load voltage V2, in the case that a predetermined voltage value Vf (where Vc<Vf<Vd, as shown in FIG. 6B) is set beforehand in the memory unit 174, and the data of the load voltage V2 received by the CPU 162 is such that Vc≦V2<Vf, i.e., in the case that the rotational velocity n2 of the second blower fan 138 is set slowly, the CPU 162 sends an instruction to the damper driver 168, whereby the ventilation switching damper 136 is rotated corresponding to the load voltage V2. Accordingly, the communication opening 134 is opened, and a portion of the first air from the first blower fan 120 is delivered from the first front passage 74, past the communication opening 134 and the first rear passage 130, and to the second cooling section 78 of the evaporator 58, and furthermore, the second air from the second blower fan 138 also is supplied past the second intake port 128 and from the first rear passage 130 to the second cooling section 78, whereby freezing and adhering of water droplets, which occur on the surface of the second cooling section 78, can be prevented (see FIG. 5).

Further, in the case that the data of the load voltage V2 received by the CPU 162 is such that Vf≦V2≦Vd, i.e., in the case that the rotational velocity n2 of the second blower fan 138 is sufficiently assured, the CPU 162 sends an instruction to the damper driver 168, thereby rotating the ventilation switching damper 136 to block the communication opening 134 (see FIG. 5).

Moreover, in the case that the data of the load voltage V1 received by the CPU 162 is such that V1=Vb, the CPU 162 constantly sends an instruction to the damper driver 168, so that the ventilation switching damper 136 is rotated to block the communication opening 134 (see FIG. 5). That is, in the case that V1=Vb, for example in the case of the defroster mode, the first blower fan 120 is operated at maximum power to rapidly introduce external air, so that fog (condensation) is eliminated from the front window of the vehicle, and visibility of occupants in the vehicle is suitably assured.

Next, an explanation shall be made concerning drive controls for the first blower fan 120 and the second blower fan 138. The drive controls for the first blower fan 120 and the second blower fan 138 are carried out so that, while the supply rate (flow rate of air) of the first air and second air supplied to the casing 52 is maintained at a necessary predetermined flow rate, the sum of the first power consumption W1 required to drive the first blower fan 120 and the second power consumption W2 required to drive the second blower fan 138 is minimized (refer to the solid line L in FIG. 8). Herein, the flow rate of air when the first blower fan 120 is driven independently can be regarded as the product of the first air flow rate A1 and the rotational speed n1. Further, as shown in FIG. 6A, the rotational velocity n1 is roughly proportional to the load voltage V1. Similarly, concerning the second blower fan 138, the flow rate of air when the second blower fan 138 is driven independently can be regarded as the product of the second air flow rate A2 and the rotational speed n2, and as shown in FIG. 6B, the rotational velocity n2 is proportional to the load voltage V2.

Further, the first power consumption W1 of the first blower fan 120 is proportional to the square of the load voltage V1, and reversely proportional to the electrical resistance R1. Similarly, the second power consumption W2 of the second blower fan 138 is proportional to the square of the load voltage V2, and reversely proportional to the electrical resistance R2.

The drive start voltage Va of the first blower fan 120, the maximum rated voltage Vb, the rotational velocity nb when the voltage Vb is applied, the first air flow rate A1 and the electrical resistance R1 can be regarded substantially as fixed values determined for each of the modes by the characteristics of the first blower fan 120. Furthermore, the drive start voltage Vc of the second blower fan 138, the maximum rated voltage Vd, the rotational velocity nd when the voltage Vd is applied, the second air flow rate A2 and the electrical resistance R2 can be regarded substantially as fixed values determined for each of the modes by the characteristics of the second blower fan 138. Accordingly, the consumption power W1 and the flow rate of air when the first blower fan 120 is driven independently is determined by the load voltage V1, and further, the consumption power W2 and the flow rate of air when the second blower fan 138 is driven independently is determined by the load voltage V2. That is, the drive controls for the first blower fan 120 and the second blower fan 138 are affected by controlling the load voltages V1, V2.

Figure 9:
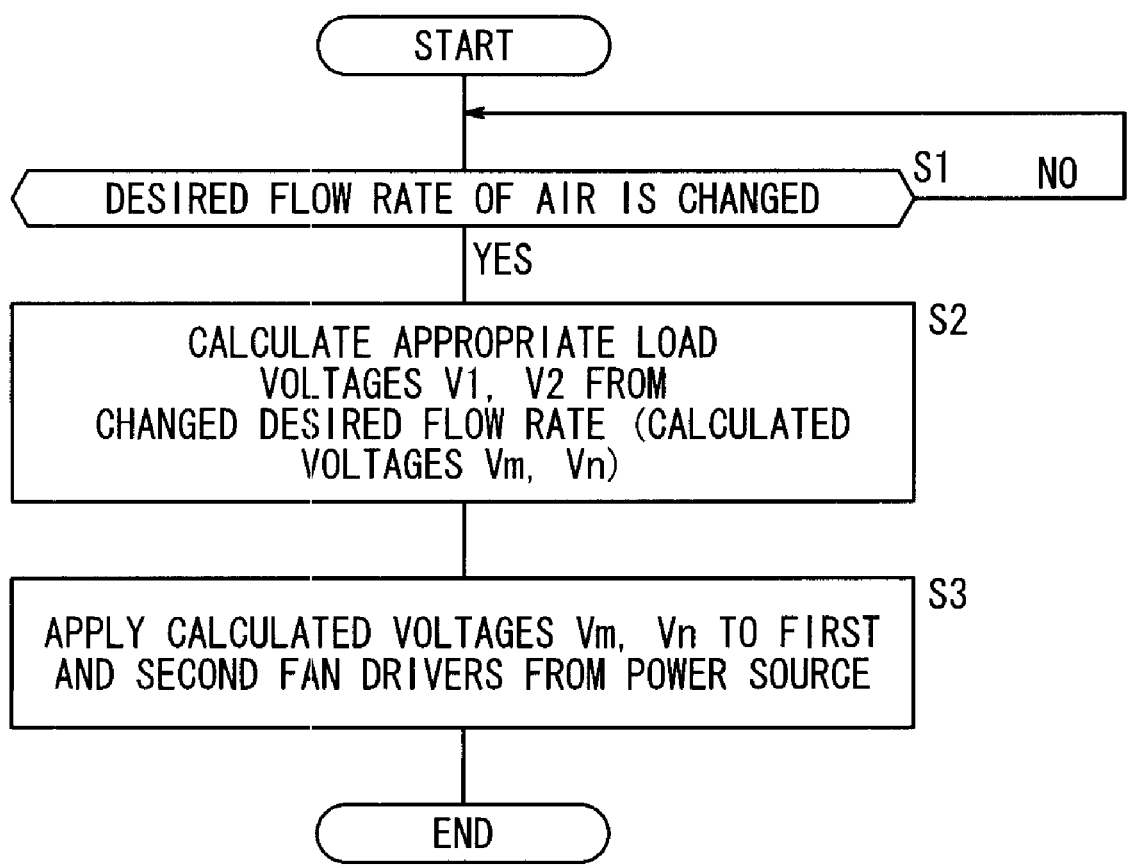
FIG. 9 is a flowchart of a drive control sequence of the first and second blower fans.

Control of the load voltages V1, V2 shall be described below with reference to FIG. 9. As described previously, the first voltage detector 164 detects the load voltage V1 supplied to the first fan driver 170, whereas the second voltage detector 166 detects the load voltage V2 supplied to the second fan driver 172.

In step S1, by an operation in the vehicle compartment performed by an occupant therein, the desired flow rate of air is changed. It will be appreciated that step S1 also is effected in the case that the vehicular air conditioning apparatus 50 is switched from an OFF state to an ON state. In the case that the desired flow rate of air is not changed, the sequence returns to step S1.

In step S2, from the desired flow rate of air, which has been changed, the CPU 162 of the controller 160 calculates a suitable load voltage V1 to be applied to the first blower fan 120, so as to reduce the sum of the consumption power of the first and second blower fans 120, 138 and thereby produce a calculated voltage Vm. Similarly, the controller 160 calculates a suitable load voltage V2 to be applied to the second blower fan 138, thereby producing a calculated voltage Vn.

In step S3, by an instruction from the CPU 162, by applying the calculated voltage Vm from the power source 176 to the first fan driver 170, the rotational velocity n1 of the first blower fan 120 is changed. Similarly, based on an instruction from the CPU 162, by applying the calculated voltage Vn from the power source 176 to the second fan driver 172, the rotational velocity n2 of the second blower fan 138 is changed. As a result, by controlling the load voltages V1, V2, desired flow rates, which have been changed, can be obtained.

Figure 8:
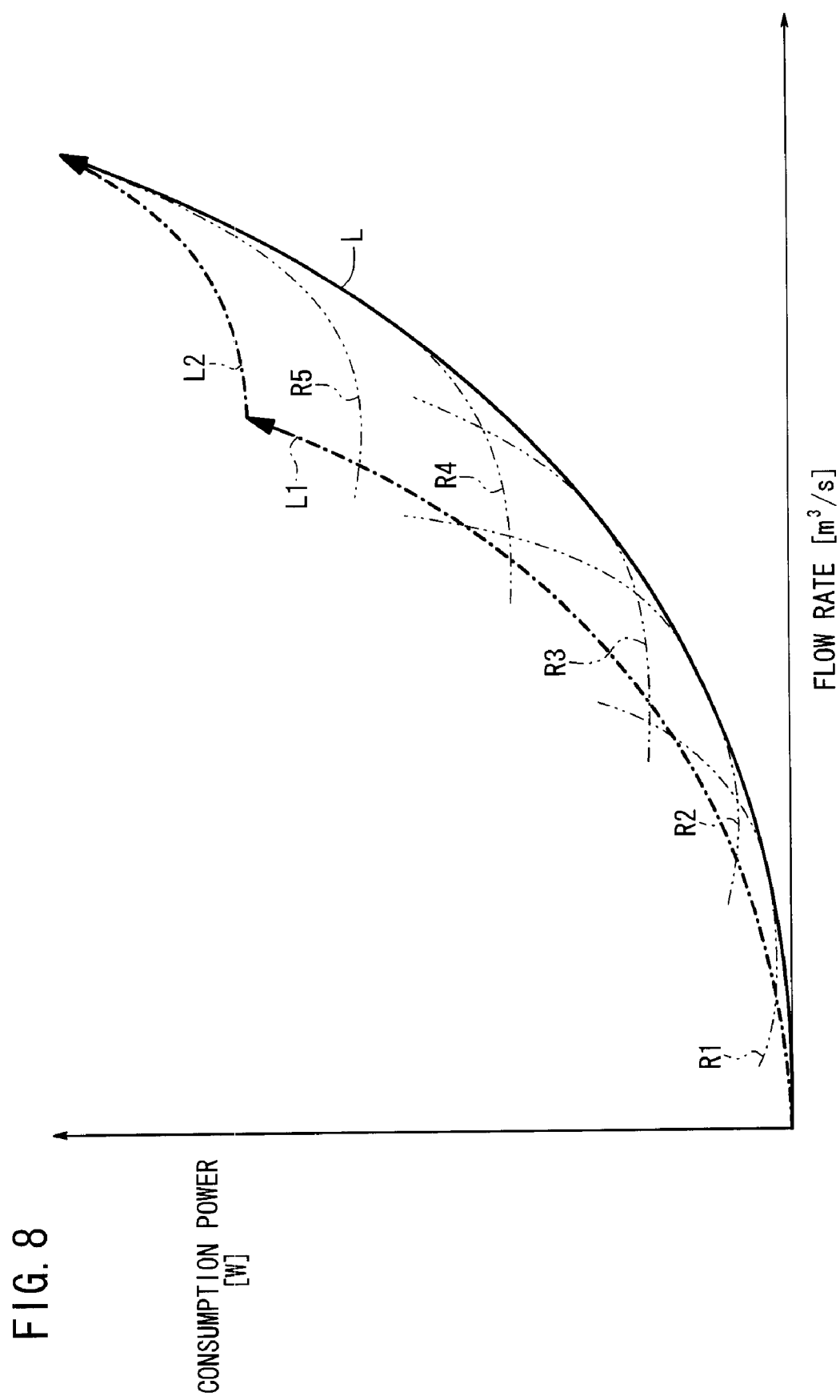
FIG. 8 is a graph of a characteristic curve showing a relationship between a flow rate of air supplied to a casing interior from the first and second blower fans, and electrical power consumption of the first and second blower fans.

As noted previously, the first consumption power W1 is determined by the load voltage V1, whereas the second consumption power W2 is determined by the load voltage V2, and the load voltages V1, V2 are controlled. Thus, driving of the first blower fan 120 and the second blower fan 138 can be controlled. As a result, as shown in FIG. 8, compared to the case where the first fan driver 170 independently drives the first blower fan 120 (refer to the broken line L1 in FIG. 8), and successively the second fan driver 172 independently drives the second blower fan 138 (refer to the broken line L2 in FIG. 8), driving of the first and second blower fans 120, 138 can be controlled so as to reduce the sum of the consumption powers of the first and second blower fans 120, 138, i.e., the sum of the first consumption power W1 and the second consumption power W2 by utilizing the first and second fan drivers 170, 172, whereby the first air and the second air can be supplied efficiently at a desired air flow rate.

The characteristic curve L is preferably drawn by connecting the least power consumption regions of the characteristic curves R1 to R5 obtained by changing the voltage of the second blower fan 138 while keeping the voltage of the first blower fan 120. In FIG. 8, the characteristic curve R1 represents the characteristics obtained by changing the voltage of the second blower fan 138 from 4 to 8 V while keeping the voltage of the first blower fan 120 at 4 V, the characteristic curve R2 represents the characteristics obtained by changing the voltage of the second blower fan 138 from 4 to 8 V while keeping the voltage of the first blower fan 120 at 6 V, the characteristic curve R3 represents the characteristics obtained by changing the voltage of the second blower fan 138 from 6 to 10 V while keeping the voltage of the first blower fan 120 at 8 V, and the characteristic curve R4 represents the characteristics obtained by changing the voltage of the second blower fan 138 from 8 to 10 V while keeping the voltage of the first blower fan 120 at 10 V, and the characteristic curve R5 represents the characteristics obtained by changing the voltage of the second blower fan 138 from 10 to 13.5 V while keeping the voltage of the first blower fan 120 at 12 V.

The aforementioned controls may also be performed based on storing an appropriate drive voltage data map beforehand in the memory unit 174, by which drive voltages are applied to the first and second blower motors 121, 141 corresponding to rotation numbers (RPS) for each of the respective blow-out modes.

In the foregoing manner, according to the embodiment of the present invention, power consumed by the first and second blower fans 120, 138 are lowered based on the load voltages V1, V2 detected by the first and second voltage detectors 164, 166 and supplied to the first and second fan drivers 170, 172. At the same time, the CPU 162 produces appropriate calculated voltages Vm, Vn so as to obtain a desired flow rate of air. Then, based on an instruction from the CPU 162, the calculated voltages Vm, Vn from the first and second fan drivers 170, 172 are applied to the first and second blower fans 120, 138. Thus, the total power consumed when driving the first and second blower fans 120, 138 with respect to the flow rate of air from the first and second blower fans 120, 138, that is, with respect to the sum of the flow rates of air from the first blower unit 56 and the second blower unit 62 can be lowered, in comparison with the total power consumed when independently driving the first and second blower fans 120, 138. As a result, the overall power consumption by the vehicular air conditioning apparatus 50 can be lowered.

The vehicular air conditioning apparatus according to the present invention is not limited to the above-described embodiment, and it is a matter of course that various modified or additional structures could be adopted without deviating from the essence and gist of the invention as set forth in the appended claims.

What is claimed is:

1. A vehicular air conditioning apparatus comprising:
a casing having a plurality of passages through which air flows, cooling means for cooling air to supply cooled air, heating means for heating air to supply heated air, and a damper mechanism for switching flow of the air that flows through the passages,
the cooling means, the heating means and the damper mechanism being disposed in an interior of the casing, wherein
the vehicular air conditioning apparatus further comprises:
a first passage disposed in the casing, the air flowing through the first passage;
a first blower connected to the first passage, a blowing rate of the air blown from the first blower to the first passage being changeable;
a second passage disposed in the casing separately from the first passage, the air flowing through the second passage;
a second blower connected to the second passage and having a maximum capacity smaller than that of the first blower, a blowing rate of the air blown from the second blower to the second passage being changeable; and
a controller for controlling driving of each of the first blower and the second blower, and
wherein the controller controls the driving of each of the first blower and the second blower such that a total power consumed when the first and second blowers are driven simultaneously is less than a total power consumed when firstly the first blower is driven and then the second blower is driven, with respect to a desired air blowing amount, wherein the controller is configured to determine load voltages for the first blower and the second blower, respectively, based on power consumption characteristic curves of a fist blower fan and a second blower fan, the load voltages providing the desired air blowing amount and providing the lower total power consumed when the first and second blowers are driven simultaneously than the total power consumed when firstly the first blower is driven and then the second blower is driven.

2. The vehicular air conditioning apparatus according to claim 1, wherein the controller controls the driving of each of the first blower and the second blower such that the total power consumed when the first and second blowers are driven simultaneously is minimized with respect to the desired air blowing amount.

3. The vehicular air conditioning apparatus according to claim 1, further comprising an opening disposed in the casing for connecting the first passage and the second passage, wherein when the first passage and the second passage are placed in communication the air flows between the first passage and the second passage through the opening.

4. The vehicular air conditioning apparatus according to claim 2, further comprising an opening disposed in the casing for connecting the first passage and the second passage, wherein when the first passage and the second passage are placed in communication the air flows between the first passage and the second passage through the opening.

5. The vehicular air conditioning apparatus according to claim 3, wherein when the first passage and the second passage are placed in communication the air flows from the first passage to the second passage through the opening.

6. The vehicular air conditioning apparatus according to claim 4, wherein when the first passage and the second passage are placed in communication the air flows from the first passage to the second passage through the opening.

7. The vehicular air conditioning apparatus according to claim 1, wherein the first passage is a passage for the air to be blown toward a front seat or front seats in a vehicle compartment, and the second passage is a passage for the air to be blown toward a rear seat or rear seats in the vehicle compartment.

8. The vehicular air conditioning apparatus according to claim 1, wherein when the controller determines load voltages for the first blower and the second blower, respectively, that provide the desired air blowing amount and provided the lower total power consumed when the first and second blowers are driven simultaneously than the total power consumed when firstly blower is driven and then the second blower is driven.

9. The vehicular air conditioning apparatus according to claim 1, wherein the controller is configured to determine load voltages for the first blower and the second blower, respectively, based on drive voltage data maps of a first blower motor and a second blower motor, the load voltages providing the desired air blowing amount and providing the lower total power consumed when the first and second blowers are driven simultaneously than the total power consumed when firstly the first blower is driven and then the second blower is driven.

10. The vehicular air conditioning apparatus according to claim 9, wherein the controller further comprises a memory unit that stores the drive voltage data maps.

11. The vehicular air conditioning apparatus according to claim 9, wherein the drive voltage data maps comprises drive voltages corresponding to rotation numbers of the first and second blower motors for various blow-out modes.

* * * * *